United States Patent
Remy (10) Patent No.: US 12,043,969 B2
(45) Date of Patent: Jul. 23, 2024

(54) BLOWER WITH CARRYING FRAME AND RETURN EFFECT

(71) Applicant: PELLENC, Pertuis (FR)

(72) Inventor: Thibault Remy, Peypin d'Aigues (FR)

( * ) Notice: Subject to any disclaimer, the term of this patent is extended or adjusted under 35 U.S.C. 154(b) by 593 days.

(21) Appl. No.: 17/426,473

(22) PCT Filed: Feb. 3, 2020

(86) PCT No.: PCT/FR2020/050171
§ 371 (c)(1),
(2) Date: Feb. 28, 2022

(87) PCT Pub. No.: WO2020/161421
PCT Pub. Date: Aug. 13, 2020

(65) Prior Publication Data
US 2022/0178097 A1   Jun. 9, 2022

(30) Foreign Application Priority Data
Feb. 7, 2019 (FR) ...................................... 1901205

(51) Int. Cl.
*E01H 1/08* (2006.01)
*A01G 20/47* (2018.01)
*A45F 3/14* (2006.01)

(52) U.S. Cl.
CPC ........... *E01H 1/0809* (2013.01); *A01G 20/47* (2018.02); *A45F 3/14* (2013.01)

(58) Field of Classification Search
CPC .. A47L 5/14; A47L 5/36; A01G 20/47; E01H 1/0809
USPC ................................................ 15/327.5, 405
See application file for complete search history.

(56) References Cited

U.S. PATENT DOCUMENTS

2016/0208449 A1   7/2016  Barth et al.
2016/0345714 A1*  12/2016  Yamaoka ................. B25F 5/02

FOREIGN PATENT DOCUMENTS

| CN | 106105798 A | 11/2016 |
| CN | 106192836 A | 12/2016 |
| EP | 3225099 A1 | 10/2017 |
| WO | 2016188410 A1 | 12/2016 |
| WO | 2017118276 A1 | 7/2017 |
| WO | 2018176295 A1 | 10/2018 |

OTHER PUBLICATIONS

Translation of the International Search Report for corresponding PCT/FR2020/050171, dated May 11, 2020.

* cited by examiner

*Primary Examiner* — Eric J Rosen
*Assistant Examiner* — John C Merino
(74) *Attorney, Agent, or Firm* — Egbert, McDaniel & Swartz, PLLC (57) ABSTRACT

A blower appliance includes: a carrying harness, at least one blower fastener, a blower having an air outlet, and a nozzle, connected downstream of the air outlet by way of an elastic bellows having a return effect. The blower fastener having an articulation having a return effect, which tends to return the axis of the air outlet of the fan body towards a rest position, the articulation having a return component, parallel to the spinal axis, with a second spinal return stiffness, the second spinal return stiffness being greater than the first spinal return stiffness of the elastic bellows. The blower appliance finds applications in the maintenance of parks and gardens.

14 Claims, 6 Drawing Sheets

BLOWER WITH CARRYING FRAME AND RETURN EFFECT

TECHNICAL FIELD

The present invention relates to blower equipment provided with a harness for carrying on the back.

Blowers are used for sweeping leaves, plant debris or snow, by means of a flow of air.

The harness for carrying on the back makes it possible to transfer all or part of the weight and/or of the return forces of the blower onto the back, the shoulders and the hips of a carrier.

The blower may be a thermal-engine blower or an electric-motor blower.

The invention finds applications in the field of the maintenance of private or public spaces as well as parks and gardens.

PRIOR ART

Blowers provided with a harness for carrying on the back are known, for example, through the following documents:
WO2017/118276
CN106105798
US2016/0208449
US2016/0345714
WO2016/188410
CN106192836

The above documents, and in particular the first two documents, show blower equipment with a harness comprising a frame for carrying on the back with a dorsal support area, carrying shoulder straps and/or a carrying belt.

The carrying frame constitutes a support receiving a fan actuated by an electric motor as well as one or more batteries for the electrical supply to the motor. The battery or batteries are positioned centrally on the frame for carrying on the back and therefore substantially aligned on the vertebral column of a carrier equipped with this frame for carrying on the back. The motor is carried by the frame for carrying on the back either directly on the back of a carrier (for example, FIG. 1 in WO2017118276) or laterally on an arm of a carrier (for example, FIG. 1 of CN106192836). In the latter case, it can be mounted with a freedom of pivoting relative to the frame for carrying on the back.

The blower is provided with a nozzle situated laterally on an arm of the carrier and connected to the fan either rigidly (the example of the blower of WO2017118276), or by means of an elastic bellows (the example of the blower of CN106192836). The nozzle constitutes the free end of an air conduit starting from the fan.

When the air conduit of the blower includes an elastic bellows between the nozzle and the fan, a carrier gripping the nozzle can orient the jet of air discharged from the nozzle by a simple movement of the arm holding a grip of the nozzle, while limiting the movements of the rest of his body.

DISCLOSURE OF THE INVENTION

The invention proceeds from the demonstration of a certain number of constraints and difficulties encountered with the known blowers carried on the back.

Such blowers are designed to supply a flow of air that may generate thrusts greater than 20 newtons requiring powerful fans. These fans are heavy and bulky, with a weight of between 8 and 15 kg depending on the power and the electrical or thermal energy incorporated. It is thus not conceivable to carry them and orient them dynamically by a single hand of a carrier for use over several hours of work. The fans carried in the hand effectively generate thrusts of below 20 newtons, for a weight of between 3 and 5 kg, which is the just acceptable limit for using them in this configuration.

The energy developed during a day or even a morning of work is great and requires heavy batteries in the case of an electric motor.

Increasing the capacity of the electric batteries supplying the electric motors of the blowers enables blowers with an increasingly high power to be manufactured. In particular, the power of an electric motor equipping the fan of a blower may exceed one kilowatt. An energy of 1 kWh can be supplied from a battery of Li-ion technology but this represents a weight to be carried of around 6 kg. Because of the discontinuous use of such a blower, a battery life of several hours can be envisaged in this case.

The high-thrust air flow of such a blower generates high reaction forces. The thrust appears at the outlet of the nozzle along the outlet axis of the nozzle and the associated reaction forces must be contained by the carrier of the blower through his hand conducting the nozzle and on his body by means of the frame for carrying on the back. Thus poor channelling of the forces may lead to discomfort in operating the blower, and be detrimental to the use thereof over prolonged periods.

It must be stated that the nozzle of the blower is continuously maneuvered by the arm of the carrier in order to judiciously direct the thrust of the air flow over the work area. The power of the air flow can be constantly adapted by the carrier by means of a discrete or progressive control device to adapt it dynamically to the work conditions encountered, during use.

However the nozzle is connected by an air pipe to the fan. This air pipe may include flexible parts such as an elastic bellows but also parts that are rigid and where applicable pivot about the axis of the pipe. These characteristics make it possible to facilitate the orientation of the nozzle by the carrier.

The blower may moreover include an articulation, for example connecting the fan to the frame for carrying on the back.

In the latter case, the changes in orientation of the nozzle in use generate a force torque at the articulation in reaction to the thrust. The amount of this torque is dependent on the thrust force and the lever arm between the direction of thrust at the outlet of the nozzle and the axis of the articulation. Apart from the very unusual cases where there is a zero value when the thrust axis intersects the articulation axis of the thrust is zero, the blower has a tendency to pivot about its articulation, causing fatigue and lack of precision in the guidance of the nozzle because of the compensation for the forces by the hand of the carrier.

Finally, because of the presence of masses disposed laterally on the frame for carrying on the back, the centre of gravity of the assembly carried on the back is not centred on the vertebral column of the carrier and contributes to an imbalance of the forces reinforced when the blower is used.

In order to obviate the difficulties mentioned above, and to improve the comfort in carrying a blower, the invention proposes blower equipment comprising:
 a carrying harness provided with a carrying frame with a dorsal support area arranged on a dorsal plane, the dorsal plane extending adjacent to the back of a carrier when the harness is worn on the back in a position of use of the blower equipment, at least one lateral blower fastener, a blower secured to the carrying frame by means of the blower fastener, and comprising a fan body with an air outlet arranged on an air-outlet axis, the blower including a nozzle, connected downstream of the air outlet by means of an elastic bellows with return effect, the elastic bellows having a return component, parallel to a spinal axis, with a first spinal return stiffness, the spinal axis being defined at an intersection of the dorsal plane and a spinal plane, perpendicular to the dorsal plane and passing through the vertebral column of a carrier when the harness is worn on the back in the position of use, and wherein the blower fastener comprises an articulation having a return effect, tending to return the air-outlet axis of the air outlet of the fan body towards a rest position, the articulation having a return component, parallel to the spinal axis, with a second spinal return stiffness, the second spinal return stiffness being greater than the first spinal return stiffness.

In the remainder of the description, and referring to a usual position of use of the blower equipment, it is considered that the dorsal plane and the spinal plane are planes that are substantially vertical and perpendicular to each other. Likewise the spinal axis is considered to be a substantially vertical axis defined by the intersection of the dorsal plane and the spinal plane.

Thus it is also considered that the bellows has a return component, parallel to the spinal axis, when it makes it possible to exert on the nozzle a return torque about at least one axis parallel to the spinal axis, i.e. a return torque counter to horizontal deflections of the nozzle on either side of a rest position.

The nozzle may have a proximal end attached to the bellows and a free distal end, the proximal end being provided with a grip. The carrier can orient the nozzle, and in particular the free end thereof, by holding the grip with his hand on the side where the blower is carried. The flow of air produced by a fan of the fan body emerges through the free end of the nozzle.

The fan is actuated by a motor of the fan body. It may optionally be a thermal engine, or preferably an electric motor.

The rest position is considered to be the position occupied by the nozzle when the holder is standing upright without exerting any intentional force on the nozzle, i.e., in particular, when he is not holding the grip. The grip may be provided with a possibility of adjustment along the proximal end of the nozzle so that, in the rest position of the blower, the carrier can seize the grip while keeping his arm along his body.

The return effect of the elastic bellows may be a return effect tending to align the nozzle axis with the air outlet axis of the fan body when the elastic bellows is in the form of a straight elastic sleeve.

It should be noted that the elastic bellows may also have coxal stiffness liable to exert a return torque on at least one coxal axis, perpendicular to the spinal axis, i.e. a return torque counter to vertical deflections of the nozzle with respect to a rest position.

Just like the elastic bellows, the articulation of the blower fastener is also liable to exert a return torque having a return component parallel to the spinal axis, i.e. counter to horizontal deflections.

As the second spinal return stiffness is greater than the first spinal return stiffness, the blower body has a tendency to remain essentially close to its rest position during movements of the nozzle having low amplitudes, or to accompany the movements of the nozzle when it is maneuvered with high deflection amplitudes, with however a deflection amplitude less than the nozzle. The effect of this characteristic is to guarantee a good transfer of the reaction forces generated by the air flow to the carrying frame. It also has the effect of adapting the rest position of the body of the fan to a carrier and to his body shape without requiring adjustments of the carrying during use of the blower. The bellows of the air pipe can thus be positioned as close as possible to the hip of the carrier and located naturally under his elbow. Fatigue of the carrier is reduced thereby because, in the majority of movements, the arm of the carrier can rest along the body of the carrier, in line with the bellows.

Despite the greater second stiffness, it is however possible, occasionally, to force the pivoting of the fan body by moving the arm manipulating the nozzle outwards by means of an additional force so as to direct the flow of air into extreme positions towards the rear of the carrier or at his feet. The maneuverability and the field of action of the air flow are thus greatly improved while limiting the efforts on the part of the carrier. The second return stiffness has the effect of rapidly repositioning the whole of the fan body towards its rest position when the arm returns to its natural position along the body of the carrier.

Furthermore, as the first spinal stiffness of the elastic bellows is proportionally lower, the actuation of the nozzle by the carrier is facilitated thereby for a wide angular deflection range.

In the rest position, i.e. when the carrier is not exerting any action on the nozzle, the air outlet access of the fan body can form, with the spinal plane, an angle preferably between −25 degrees of angle and +25 degrees of angle. The angle in question is an angle the vertex of which is situated to the rear of the dorsal plane.

According to a particular possibility of implementation of the return-effect articulation, the latter may be provided with a hinge arranged on an articulation axis.

The articulation axis is not necessarily parallel to the spinal axis. More precisely, and according to a preferred embodiment, the articulation axis may be inclined with respect to the spinal axis, the inclination being between 5 and 45 degrees of angle.

The vertex of the angle of inclination in question is located above the articulation in a position of use of the blower equipment.

The inclination can, in this case, be taken advantage of so that the mass of the blower is involved in the return component parallel to the spinal axis.

The inclination with respect to the spinal axis may be broken down according to the dorsal plane and the spinal plane.

Thus the articulation axis may have an inclination that is convergent with respect to at least one from the dorsal plane and the spinal plane. It is considered that the inclination is convergent when it converges in the direction of the head of a wearer of the harness, when the harness is worn.

The angle of inclination of the articulation axis with respect to the dorsal plane may preferably be between 20 and 45 degrees of angle while the angle of inclination with respect to the spinal plane may preferably be between 5 and 40 degrees of angle. The angles considered are angles the vertex of which is situated above the articulation, in the position of use of the blower equipment.

It should be stated that the articulation having return effect is not necessarily a hinge articulation. It may in fact be an articulation in the form of a block of flexible and resilient material, comparable to a Silentbloc. In this case, the articulation has a return component parallel to the spinal axis with the second spinal stiffness, but may also have a stiffness, different or not, on other articulation axes.

As indicated previously, the weight of the blower may contribute to the return torque, in particular when the articulation is an articulation with a convergent inclined hinge. This is because, and according to a preferred embodiment of the blower, a centre of gravity of the blower is located at the front of the blower fastener in the direction of the nozzle.

This arrangement favours the return of the blower into the rest position under the effect of its own weight.

However, the articulation having return effect may also include a return spring. The stiffness of this spring may constitute or participate in the second spinal stiffness, i.e. in the stiffness of the articulation in the spinal component thereof.

The articulation may furthermore include a brake selected from a friction brake around the articulation axis, a friction ratchet, a friction indexing and an elastic-coupling brake.

Friction ratchet means an axially anisotropic brake device having one direction with a higher friction and one direction with a lower friction over the same angular range.

Friction indexing means an axially anisotropic brake device having an alternation of angular ranges with a higher coefficient of friction and angular ranges with a lower coefficient of friction.

Elastic-coupling brake means a brake having, apart from a friction effect, an elastic return effect contributing to the stiffness of the articulation in the spinal component thereof.

Advantageously, the lateral fastener of the blower may be a fastener that is removable without a tool. It is considered that the fastener is removable without a tool when it is provided with an attachment member that can be actuated by hand and enables the carrier to place the blower on the carrying frame and to remove the blower from the carrying frame without using a tool. Such an attachment member may include a fitting-together with complementarity of shape or a screw ring provided with a knurled nut that can be actuated by hand, for example.

Moreover, the blower fastener may be configured so as to have a plurality of attachment positions on the carrying frame, corresponding to various lateral positions of the articulation axis and/or various inclinations of the articulation axis of the hinge. Various lateral positions of the articulation axis means positions having a more or less great separation with respect to the spinal plane or having various heights on the carrying frame.

The frame may for example include a plurality of fitting-together runners or a plurality of screwing bases for attaching the blower.

The possibility of changing the inclination of the axis of the hinge makes it possible to modify the relative position of the blower both with respect to the harness and with respect to the harness-carrying frame. The contribution of the weight of the blower in the return force exerted by the articulation is modified thereby. This is because the degree of inclination of the articulation axis with respect to the spinal axis changes the component of the return torque exerted on the spinal axis and therefore the second spinal stiffness of the articulation having return effect.

The lateral position of the blower, combined with the option of adapting the return stiffness, thus procures easy adaptation of the blower to a carrier and to his body shape.

The blower equipment may also include an electric battery for supplying energy to the blower, the electric battery being attached to the carrying frame of the carrying harness.

The presence of a battery or at least of a location for a battery is desirable when the fan is a fan with electric motor.

So as to facilitate the orientation of the nozzle in front of the carrier, all or part of the blower may be carried laterally by running along the flank of the carrier. This carrying of the blower results from the lateral attachment of the blower on the carrying frame.

Advantageously, the electric battery may have a centre of gravity offset with respect to the spinal plane, opposite to the fan body. Offsetting the battery opposite the body of the fan, and more generally opposite the blower, makes it possible to distribute and balance the weight of the loads on the carrying frame.

In particular, the amplitude of the offset of the battery with respect to the spinal plane can be determined according to the weights of the battery and of the blower, so that the centre of gravity of the blower equipment taken overall is located on the spinal plane or as close as possible to the spinal plane.

The blower equipment may also include at least one obstruction limiting an angular movement of the fan body, the obstruction comprising at least one from a stop and a strap. The strap may be elastic or not. The stop and the strap may be disposed, for example, between the fan body and the carrying frame. Movement amplitude limitation stops may also be provided on the articulation of the blower fastener.

Limiting an angular movement of the fan body can be used for avoiding positions of the blower that are uncomfortable or dangerous for the carrier. It also makes it possible to guarantee good transmission of the blowing return forces to the carrying frame.

Other features and advantages of the invention will emerge from the following description, with reference to the figures of the drawings. This description is given by way of illustration and non-limitatively.

BRIEF DESCRIPTION OF THE FIGURES

The figures are executed schematically and to free scale.

DETAILED DESCRIPTION OF EMBODIMENTS OF THE INVENTION

In the following description, identical or similar parts of the various figures are marked with the same reference signs.

The blower equipment 10 visible in FIGS. 1 to 8 comprises a carrying harness 12 provided with a carrying frame 14 with a dorsal support surface 16. The dorsal support area 16 comes into abutment on the back of a carrier and extends along a dorsal plane Pd shown in FIGS. 4 to 8.

The position of the elements of the blower equipment are defined essentially with respect to the dorsal plane Pd, but also with respect to a spinal plane Ps, perpendicular to the dorsal plane and passing through the vertebral column of the carrier, and with respect to a spinal axis S defined by the intersection of the dorsal plane Pd and the spinal plane Ps.

The harness 12 is provided with shoulder straps 18 and a belt 20, enabling it to be attached to the body of the carrier.

Figure 3:
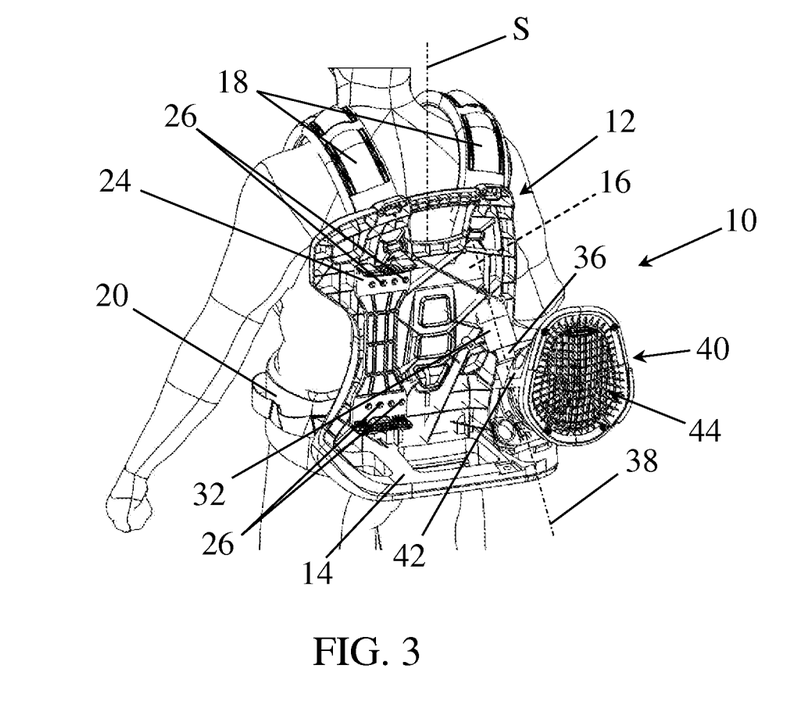
FIG. 3 is a perspective view comparable to that of FIG. 2, on which a battery of the blower equipment has been removed.

An electrical supply battery 22 is secured to the frame 14 by means of an attachment interface visible in FIG. 3. It is for example in the form of an attachment plate 24.

The attachment plate 24 is attached adjustably to the carrying frame 14 by means of fasteners 26. This makes it possible to laterally offset the battery in discrete positions by a screw and nut system (not detailed in FIG. 3).

The lateral adjustment of the position of the battery may also be a continuous adjustment by mounting the attachment plate 24 on an attachment rail for example. Offsetting the battery means with respect to the spinal plane Ps as shown in particular by FIGS. 4 to 8, so that the weight of the battery balances that of a blower 40 carried on an opposite side of the carrying frame 14, with respect to the spinal plane Ps.

As indicated above, the attachment is preferably configured so as to allow lateral adjustment of the position of the battery. Thus, because of the relative weights of the battery 22 and of the blower 40, and by adjusting the lateral position of the battery, it is possible to move the centre of gravity of the blower equipment 10 in order to move it as close as possible to the spinal plane Ps. The centre of gravity of the blower equipment 10 is preferably located on the spinal plane Ps.

Figure 1:
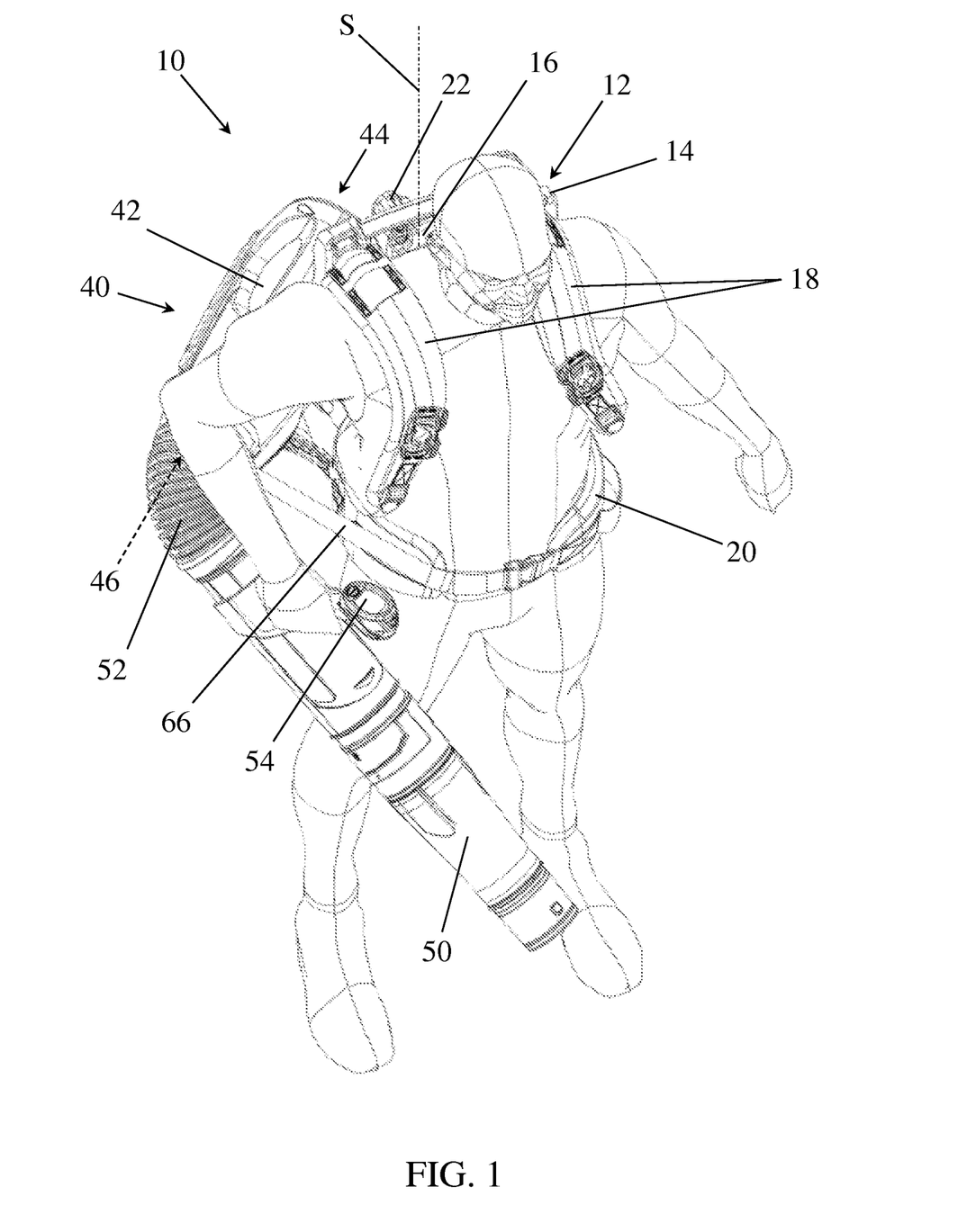
FIG. 1 is a schematic perspective view from above of a carrier in a position of use of blower equipment according to the invention.
Figure 2:
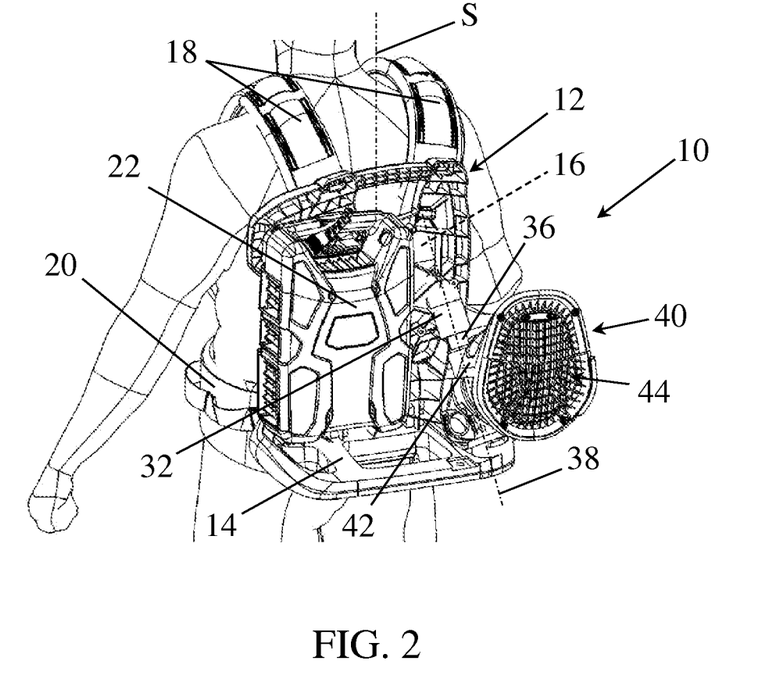
FIG. 2 is a partial rear perspective of the carrier of FIG. 1, the blower being in a rest position.

As shown by FIGS. 2 and 3, a blower fastener 32 connects the blower 40 to the carrying frame 14. More precisely, the blower fastener connects a rear part of the blower, in this case a fan body 42 of the blower 40, to the carrying frame 14. Thus the centre of gravity of the blower 40 is situated in front of the location of the blower fastener, in the direction of an air outlet.

The blower fastener 32 is a member comprising an articulation with return effect 34, provided with a hinge 36 arranged on an articulation axis 38. The articulation axis 38 has an inclination with respect to the spinal axis S. It also has an inclination with respect to the dorsal plane Pd and with respect to the spinal plane Ps as shown by FIGS. 4 to 8. The angle with respect to the dorsal plane is preferably between 20 and 45 degrees of angle while the angle with respect to the spinal plane is preferably between 5 and 40 degrees of angle. Angles of inclination in these ranges make it possible to optimise both the return forces and the comfort of the carrier, in particular during prolonged use of the blower equipment.

The fan body 42 is equipped with a fan with an electric motor supplied with energy by the battery 22. The fan body comprises an air inlet 44 and an air outlet 46. As shown by FIGS. 1 to 4, the fan body is in the form of a straight portion of the fan, so that the air inlet 44 and the air outlet 46 are coaxial. The air inlet and outlet may also not be coaxial but this then increases the pressure drops in the air flow in the fan body.

The air outlet 46 is arranged on an air outlet axis 48. A nozzle 50 is connected to the air outlet 46 by means of an elastic bellows 52. The nozzle has a grip 54 on the top, held in the hand by the carrier and enabling the carrier to orient the nozzle.

Figure 4:
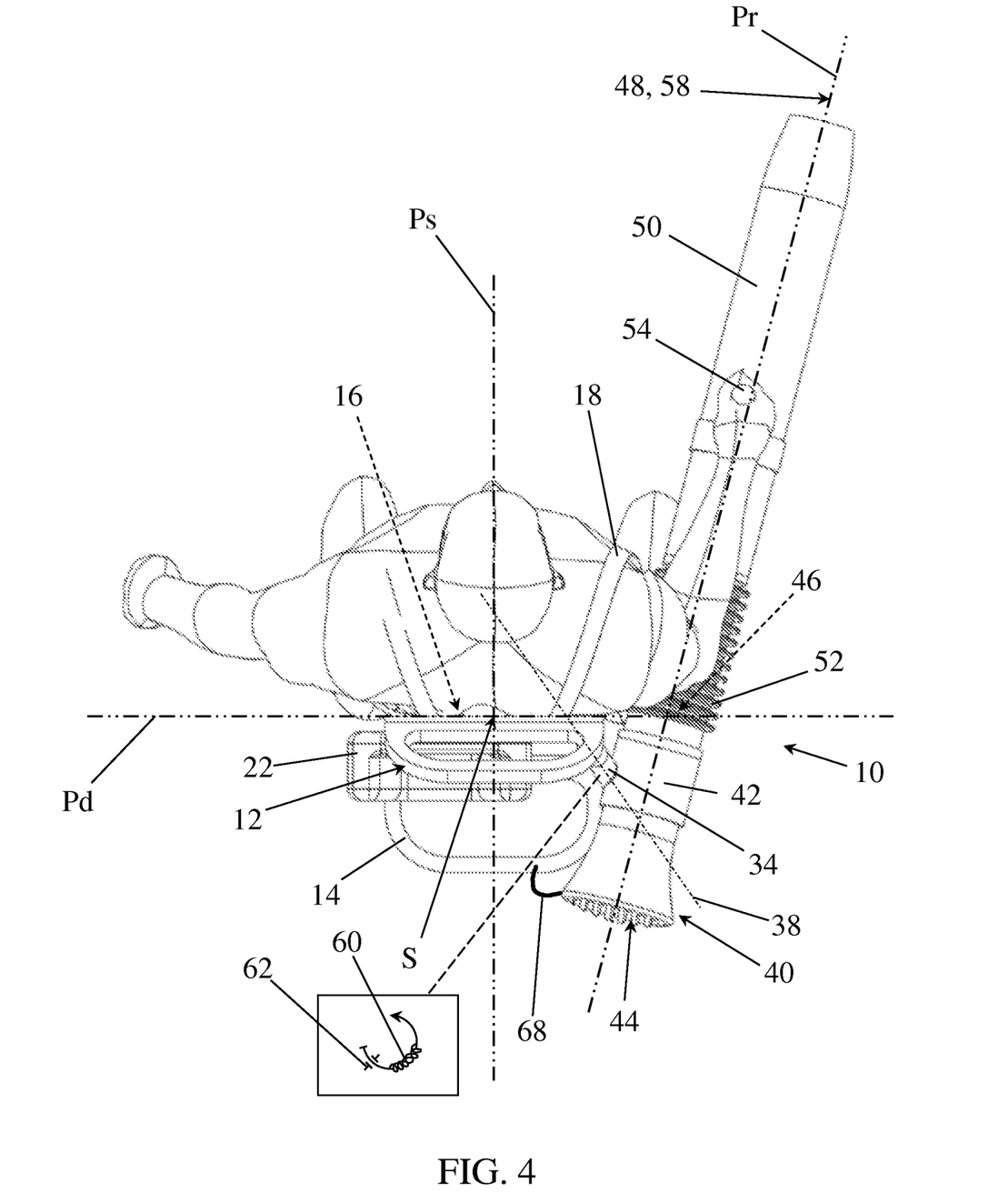
FIG. 4 is a schematic view from above of a carrier with blower equipment comparable to that of FIG. 1, in a rest position.

In the absence of an action on the grip 54, the nozzle, and more generally the blower, are located in a rest position illustrated in FIG. 4. An axis 58 of the nozzle and the axis 48 of the air outlet 46 of the fan body are then located in the same rest plane Pr.

The rest plane Pr may be parallel to the spinal plane Ps, or may form with respect to this plane an angle of preferably less than +/−25 degrees of angle. The rest plane Pr is preferably located close to the hip of the carrier.

The carrier can make horizontal sweeps with the nozzle by exerting a force on the grip 54 by a pivoting movement of the forearm. The main effect of these horizontal sweeps is to deform the bellows 52, i.e. to deflect the nozzle axis 58 with respect to the air outlet axis 48 of the fan body. Secondarily, and in particular when the carrier exerts a greater force on the grip 54 by combined movements of the arm and forearm, the horizontal sweep is also accompanied by a deflection of the air outlet axis 48 with respect to the rest plane Pr. Various angular positions are shown schematically in FIGS. 4 to 8.

Figure 5:
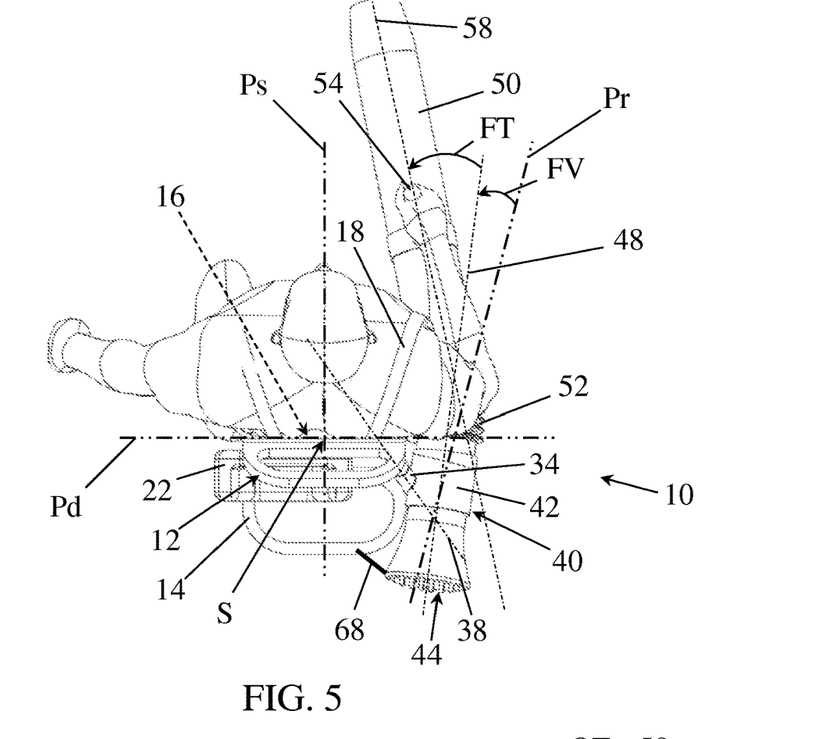
FIGS. 5 and 6 are views from above of the carrier with the blower equipment of FIG. 4, and illustrate sweeping movements.
Figure 6:
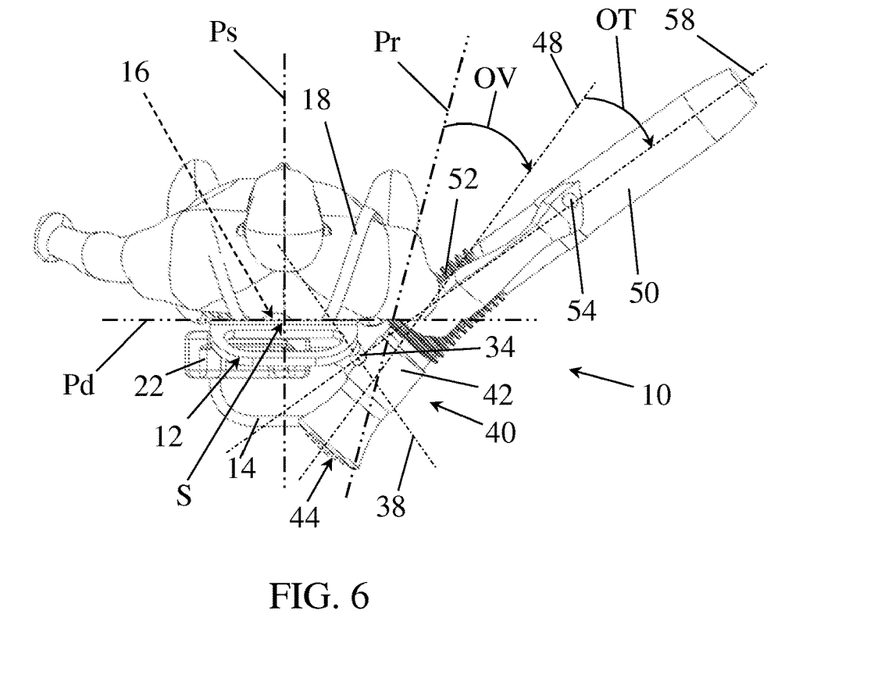

Sweeping positions on either side of the rest plane Pr are illustrated by FIGS. 5 and 6.

In the remainder of the description a so-called closure sweep can be seen when the end of the nozzle moves in a movement oriented from the rest position Pr towards the spinal plane Ps, and a so-called opening sweep when the end of the nozzle moves in a movement oriented from the spinal plane towards the rear plane Pr, and beyond the rest plane Pr. The sweeps should be understood as horizontal sweeps, while being able to comprise vertical movements during the sweeping.

The closure sweep is characterised by a closing angle FT of the nozzle. This is an angle measured between the air outlet axis 48 of the fan body 42 and the axis 58 of the nozzle 50. Optionally, the closure sweep may also be characterised by a closing angle FV of the fan body. The closure angle FV of the fan body is measured between the rest plane Pr and the air outlet axis 48 of the fan body 42. It should be noted that the closing angle of the fan body may be limited to a zero value, by a stop or a strap, in a manner described below.

Conversely, the opening sweep is characterised by an opening angle OT of the nozzle with respect to the air outlet axis, optionally combined with an opening angle OV of the fan body with respect to the rest plane Pr.

In the example embodiment in FIG. 5, the air outlet axis 48 of the fan separates from the plane Pr by an angle FV when the nozzle makes a closure sweep. The value of the angle FV may be limited by an obstruction on the blower equipment. The obstruction may consist of a stop formed for example by a part of the belt 20 of the carrying harness extending over the hip of the carrier. This part of the belt 40 is visible in FIG. 1. The amount of the closing angle FV of the fan body may also be limited by an obstruction in the form of a strap 68, as shown by FIGS. 4 and 5. The strap 68, shown schematically, is preferably a non-elastic strap. It connects the blower 40 to the carrying frame 14 to the rear of the dorsal plane Pd. The strap 68 can be fixed to the blower in the vicinity of the air inlet 44 thereof.

During an opening scanning, as illustrated in FIG. 6, the fan body follows the deflection of the nozzle with a fan body opening angle OV smaller than or equal to the nozzle opening angle OT. The fan opening angle may also be limited by an obstruction defining a maximum opening. This obstruction may be implemented in the form of a strap 66 visible in FIG. 1. The strap 66 connects the can body 42 to the belt 20 of the carrying harness. The strap 66 may be elastic. The obstruction may also be defined by the interaction between a shape of the fan body, for example the air inlet 44, coming into abutment on a shape of the carrying frame 14 to the rear of the dorsal plane.

"Phase difference" means the tendency of the fan body to follow the movement of the nozzle in horizontal sweeping movements, with a smaller opening or closing amplitude and optionally with a delay with respect to the movements of the nozzle. An optional delay may be due to a threshold effect that means that a fan body movement requires exceeding a certain bending force on the bellows 52 of the nozzle 50.

The phase difference or the difference in deflection amplitude is essentially due to a return stiffness of the articulation with return effect 54 that is greater than the stiffness of the elastic bellows 52.

The return stiffness to which reference is made here is a component of the return stiffness parallel to the spinal axis. In other words, and as indicated previously, a second spinal return stiffness of the articulation with return effect 34 is greater than a first spinal return stiffness of the elastic bellows.

As mentioned previously, a return effect is obtained by means of the inclination of the articulation axis 38, so that the weight of the blower has a tendency to spontaneously return the blower to the rest plane Pr.

The return effect can be accentuated, or on the contrary restricted, by equipping the articulation with return effect with a return spring 60 or with a brake 62 arranged around the articulation axis 38 and exerting return or braking torques on this axis. The brake 62 may in particular be a friction brake or a ratchet brake. A brake with elastic coupling can combine the effects of the spring and of the brake. The return spring 60 and the brake 62 are indicated symbolically in FIG. 4.

The stiffness of the return, and in particular the second spinal return stiffness, can be modified, either by acting on the stiffness of the return spring 60, if such a spring is provided, but also by acting on the inclination of the articulation axis 38. This inclination is fixed in the example embodiment in FIGS. 1 to 8. It may also be designed to be adjustable with discrete or continuous positions of the connections between the lateral blower fastener 32 and the carrying frame 14, making it possible to adjust in particular the inclination of the articulation axis 38.

It should be noted that the carrier of the blower equipment can also make vertical sweeps, i.e. move the nozzle parallel to a vertical plane, that is to say a plane containing the spinal axis S. The elastic bellows 32 also exerts, counter to the vertical sweep, a return force tending to return the nozzle to a rest position wherein the nozzle axis 58 forms with respect to the ground an angle of between 20 and 60 degrees of angle.

FIGS. 5 and 6 are figures illustrating standard "horizontal" sweep movements made by blower equipment according to the invention, around a rest position illustrated by FIG. 4. These movements are the most frequent movements during the use of the equipment. During these movements, of moderate amplitude, most of the deflection of the nozzle 50 is obtained by flexing the bellows 52, with optionally an accompaniment of smaller amplitude of the movement of the fan body about the articulation axis 38 of the articulation 34 of the fastener 32 of the blower on the carrying frame 14. These movements of the nozzle have an angular movement FT+FV with FT>=FV when the movement is a closure movement (FIG. 5), and an angular movement OT+OV with OT>=OV when the movement is an opening movement (FIG. 6). The rotation movement about the articulation axis 38 and the deflection take place in the same direction, in a closing or opening sweep.

Figure 7:
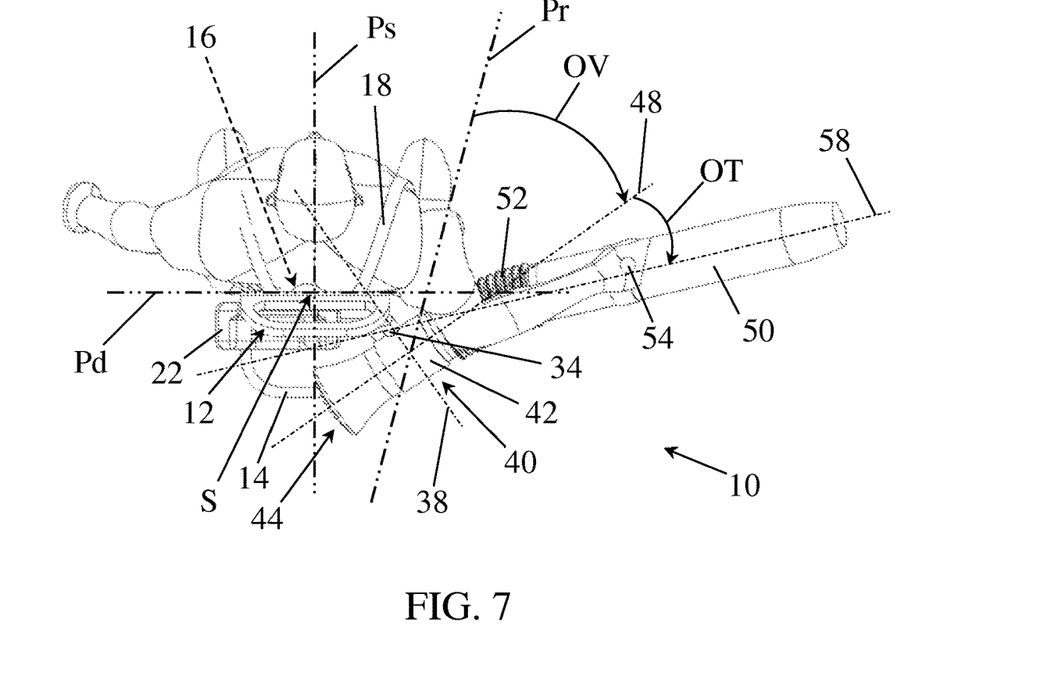
FIGS. 7 and 8 are views from above of a carrier with the blower equipment of FIG. 4 and illustrate sweeping movements in extreme positions, the arms of the carrier then being separated with forces at a distance from the body of the carrier.
Figure 8:
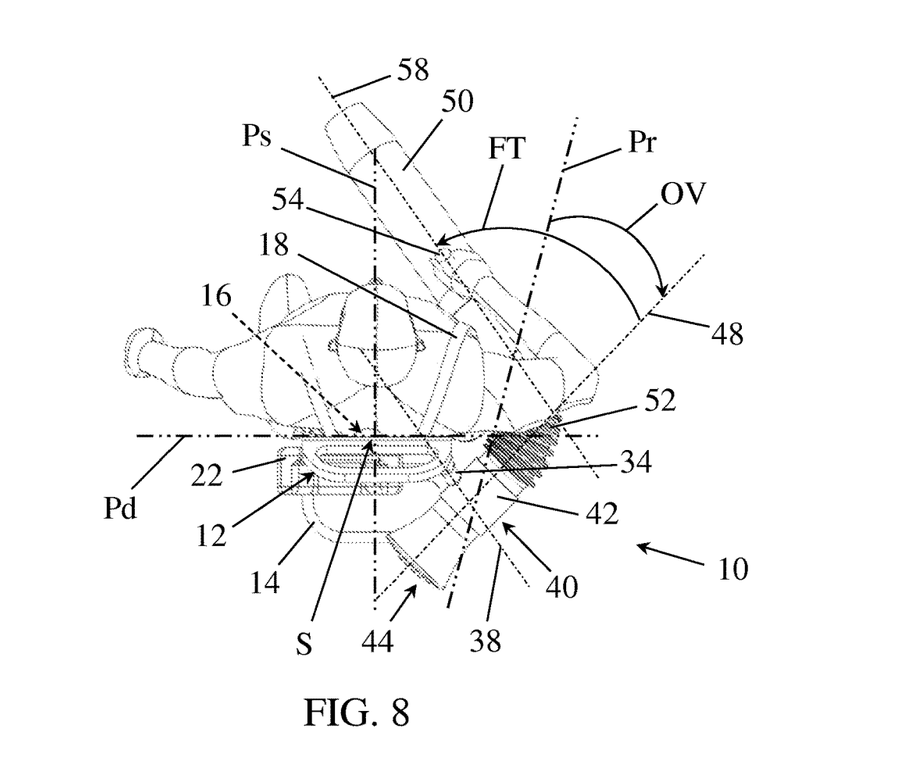

In contrast, FIGS. 7 and 8 show exceptional movements, during which the user imposes on the blower a greater rotation amplitude about the articulation axis 38 of the blower fastener 32 in order to bring about a larger opening angle or closing angle of the fan body 42 with respect to the rest position in the rest plane Pr, or to cause opposing movements of the fan body and of the nozzle.

In the case of FIG. 8, the movement of the nozzle 50 and that of the fan body 42 are opposing. This is because the fan body 42 makes an opening movement with a large opening angle OV and the nozzle 50 makes a closing movement with an also large closing angle FT.

In the case of FIG. 7, the fan body 42 and the nozzle 50 make an opening movement with an opening angle equal to OT+OV. It should be noted however that the opening angle of the fan body OV is here very much greater than the opening angle of the nozzle OT, unlike what occurs during standard movements.

It can be noted that the carrier of the blower equipment has his elbow positioned close to his trunk during standard movements described with reference to FIGS. 5 and 6. It is mainly the forearm that moves and exerts on the grip the angular deflection forces necessary for sweeping. In contrast, for the exceptional movements in FIGS. 7 and 8, it can be noted that the elbow of the user is away from the trunk. The carrier then uses his arm in addition to his hand positioned on the grip to exert forces with components parallel to the nozzle axis 58 or parallel to the air outlet axis 48 of the fan body to constrain the movements about the articulation axis 38 of the hinge 36 forming the fastener of the blower.

Because of the second spinal return thickness greater than the first spinal return thickness, the forces involved for opening the air outlet axis 48 are greater, but thereby avoid unwanted openings of the fan body due to its weight, and therefore destabilising the carrier when the carrier leans to the blower side for example.

Figure 9:
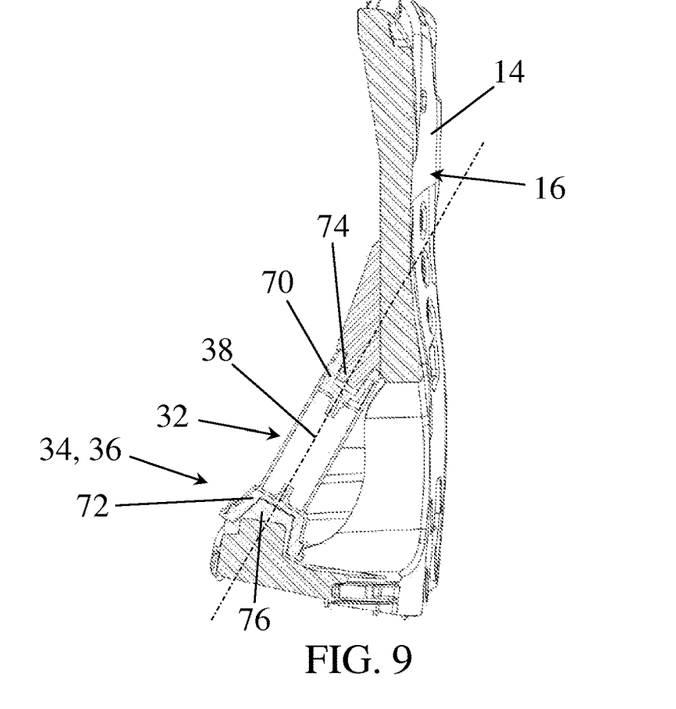
FIG. 9 is a schematic cross section of a carrying frame of equipment according to the invention passing through an articulation axis of a lateral fastener of a blower of equipment according to the preceding figures.

FIG. 9 shows a cross section of the carrying frame 14 of the carrying harness along a cutting plane substantially perpendicular to the dorsal plane Pd and passing through the articulation axis 38 of the articulation with return effect 34 of the lateral fastener of the blower 32.

The hinge 36 of the articulation with return effect 34 has a movable part with conical ends 70, 72 received on bases 74, 76 secured to the carrying frame 14. The bases 74, 76 are also conical and with a shape respectively complementary to the conical ends 70, 72 of the movable part of the articulation 34.

The mutual friction of the conical parts fitted together makes it possible to constitute a brake with a relative braking effect opposing the free rotation about the articulation axis 38.

Figure 10:
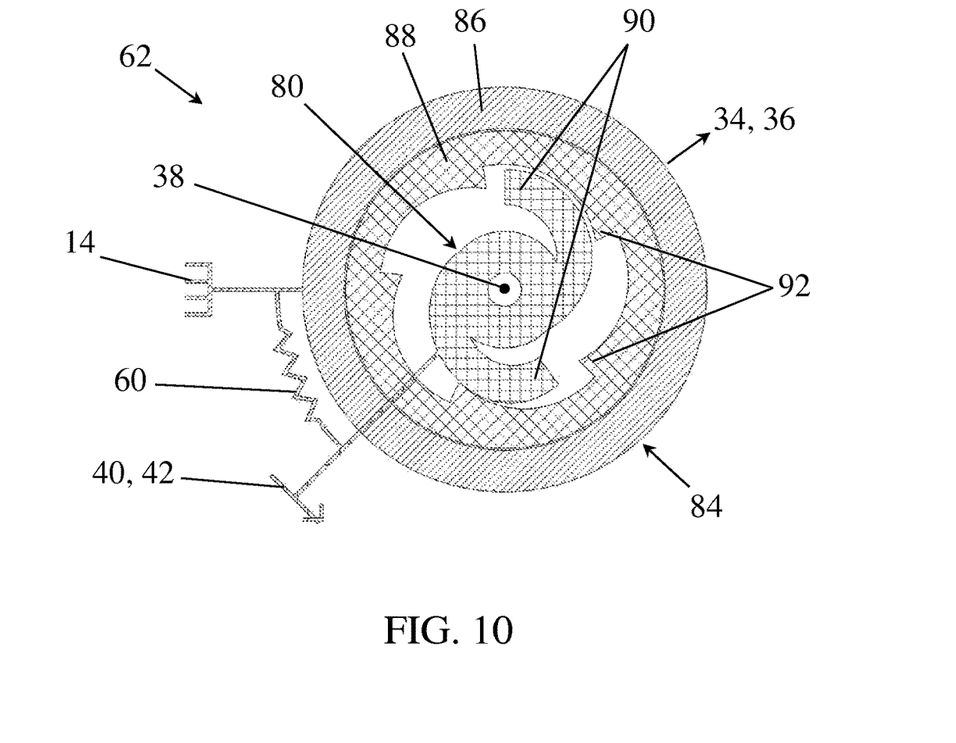
FIG. 10 is a schematic cross section, perpendicular to its axis, of a brake and more precisely of a ratchet brake able to equip an articulation of the blower equipment.

FIG. 10 shows to a larger scale another possibility of implementation of a brake 62 able to equip the hinge of the articulation with return effect 34.

The friction ratchet comprises a rotor 80 secured to the blower 40, and more precisely to the fan body 42, and a stator 84 secured to the carrying frame 14. The stator 84 is provided with a casing 86 and a friction ring 88 having, with respect to the casing, a freedom of rotation about the articulation axis 38 of the hinge with a first coefficient of friction. The rotor also has a freedom of rotation about the articulation axis 38 of the hinge. It is provided with ratchets 90 complementary to internal teeth 92 on the friction ring. Rotation of the rotor with respect to the friction ring 88 is possible only in one rotation direction. A rotation in an opposite direction is prevented by an interaction between the ratchets 90 and the teeth 92 on the friction ring. In this case, only a rotation between the friction ring 88 and the casing 86 remains possible.

In the rotation direction allowed by the ratchets 90 and the teeth 92, an interaction between the ratchets 90 and the friction ring 88 allows a rotation about the axis 38 with a second coefficient of friction lower than the first coefficient of friction.

Thus the brake 62 of the hinge has anisotropy with a first coefficient of friction in a first direction of pivoting of the blower and a second coefficient of friction, different from the first coefficient of friction, in a second direction of pivoting of the blower, opposite to the first direction of pivoting. The lowest coefficient of friction may be associated with the closure sweep movements, and the highest coefficient of friction may be associated with the closing sweep movements.

An additional return effect adding where applicable to the one resulting from the inclination of the articulation axis 38 is provided by the return spring 60 indicated symbolically. It thus participates in the second spinal return stiffness mentioned previously.

The invention claimed is:

1. Blower equipment comprising:
a carrying harness provided with a carrying frame with a dorsal support area arranged on a dorsal plane, the dorsal plane extending adjacent to the back of a carrier when the carrying harness is worn on the back in a position of use of the blower equipment,
at least one lateral blower fastener,
a blower secured to the carrying frame by the lateral blower fastener, and comprising a fan body with an air outlet arranged on an air-outlet axis, the blower including a nozzle, connected downstream of the air outlet by an elastic bellows with a return effect, the elastic bellows having a return component, parallel to a spinal axis, with a first spinal return stiffness, the spinal axis being defined at an intersection of the dorsal plane with a spinal plane, perpendicular to the dorsal plane and passing through the vertebral column of a carrier when the carrying harness is worn on the back in the position of use,
and wherein:
the lateral blower fastener comprises an articulation having a return effect, tending to return the air-outlet axis of the air outlet of the fan body towards a rest position, the articulation having a return component, parallel to the spinal axis, with a second spinal return stiffness, the second spinal return stiffness being greater than the first spinal return stiffness.

2. Equipment according to claim 1, wherein the articulation with return effect is an articulation provided with a hinge arranged on an articulation axis.

3. Equipment according to claim 2, wherein the articulation axis is inclined with respect to the spinal axis, having an angle of inclination between 5 and 45 degrees of angle.

4. Equipment according to claim 2, wherein the articulation axis has an inclination that is convergent with respect to at least one of the group consisting of the dorsal plane and the spinal plane.

5. Equipment according to claim 4, wherein the angle of inclination of the articulation axis with respect to the dorsal plane is between 20 and 45 degrees of angle and wherein the angle of inclination with respect to the spinal plane is between 5 and 40 degrees of angle.

6. Equipment according to claim 1, wherein the articulation with return effect comprises a return spring (60).

7. Equipment according to claim 2, wherein the articulation comprises a brake selected from a friction brake around the articulation axis, a friction ratchet, a friction indexing and an elastic coupling brake.

8. Equipment according to claim 1, including at least one obstruction for limiting an angular movement of the fan body, the obstruction comprising at least one of the group consisting of a stop and a strap.

9. Equipment according to claim 1, wherein the lateral blower fastener is a fastener that is removable without a tool.

10. Equipment according to claim 1, comprising an electric battery for supplying the blower with energy, the electric battery being attached to the carrying frame of the carrying harness.

11. Equipment according to claim 10, wherein the electric battery has a center of gravity offset with respect to the spinal plane, opposite to the fan body.

12. Equipment according to claim 1, wherein the air outlet axis of the blower forms, with the spinal plane, an angle of between −25 degrees of angle and +25 degrees of angle, in the rest position.

13. Equipment according to claim 1, wherein the nozzle has a proximal end attached to the elastic bellows and a free distal end, the proximal end being provided with a grip.

14. Equipment according to claim 1, wherein a center of gravity of the blower is located in front of the lateral blower fastener in the direction of the nozzle.

* * * * *